US006761392B2

(12) United States Patent
Hasselgruber et al.

(10) Patent No.: US 6,761,392 B2
(45) Date of Patent: Jul. 13, 2004

(54) MULTI-PART HARDTOP VEHICLE ROOF

(75) Inventors: Andreas Hasselgruber, Eberdingen-Nussdorf (DE); Wojciech Wezyk, Sindelfingen (DE); Emil Schnell, Konstanz (DE); Klaus Laue, Dreieich (DE)

(73) Assignee: CTS Fahrzeug Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/616,524

(22) Filed: Jul. 10, 2003

(65) Prior Publication Data

US 2004/0007897 A1 Jan. 15, 2004

Related U.S. Application Data

(63) Continuation-in-part of application No. PCT/EP02/10691, filed on Sep. 24, 2002.

(30) Foreign Application Priority Data

Sep. 25, 2001  (DE) .......................................... 101 47 015

(51) Int. Cl.⁷ ................................................. B60J 7/14
(52) U.S. Cl. .................................. 296/108; 296/107.17
(58) Field of Search ...................... 296/107.17, 100.17, 296/108, 107.07, 107.08

(56) References Cited

U.S. PATENT DOCUMENTS

| 6,131,988 A | 10/2000 | Queveau et al. |
| 6,505,881 B2 * | 1/2003 | Kinnanen ............... 296/107.17 |
| 2003/0201658 A1 * | 10/2003 | Obendiek et al. ........... 296/108 |

FOREIGN PATENT DOCUMENTS

| DE | 3903358 A1 * | 8/1990 | ................. 296/108 |
| EP | 0 835 779 | 4/1998 | |
| EP | 0 993 979 | 4/2000 | |
| FR | 2 791 007 | 9/2000 | |

* cited by examiner

Primary Examiner—Jason Morrow
(74) Attorney, Agent, or Firm—Klaus J. Bach

(57) ABSTRACT

In a hardtop vehicle roof which is movable between a closed position, in which it covers a vehicle interior, and a storage position and which includes rigid roof shells which, in the closed position, are disposed end to end adjacent one another, at least one of the roof shells includes a center section and side sections which are pivotally connected to the center section and the center sections are displaced in the storage position of the roof shells upwardly relative to the respective side sections so as to be received within one of the roof shells thereby to reduce the volume required for the storage of the roof shells in the storage position thereof.

9 Claims, 5 Drawing Sheets

MULTI-PART HARDTOP VEHICLE ROOF

This is a Continuation-In-Part application of international application PCT/EP02/10691 filed Sep. 24, 2002 and claiming the priority of German application 101 47 015.0 filed Sep. 25, 2001.

BACKGROUND OF THE INVENTION

The invention resides in a multi-part hardtop vehicle roof, which is movable between a closed position, in which it covers the interior space of a vehicle, and a storage position, and which includes rigid roof shells which are disposed in the longitudinal vehicle direction behind one another when the roof is closed.

FR 27 91 001 A1 discloses a two-part hardtop vehicle roof with a front and a rear roof shell wherein the rear roof shell comprises two side C-columns and a rear window panel which is engaged between the two C-columns and pivotally connected to the C-columns. For the transfer of the roof parts from the closed position to the storage position, the C-columns are pivoted backward about a vehicle body based pivot axis and, at the same time, the rear window panel is pivoted relative to the C-columns in such a way back into the trunk, that it is disposed therein with its outside surface directed upwardly, that is, essentially in the same orientation. The C-columns and the rear window panel are therefore disposed in the trunk in an opposite orientation. Because if the outwardly curved rear window panel, the trunk volume is increased with this arrangement, but the arrangement is limited to two part hardtop vehicle roofs wherein the front part can be deposited in the trunk in the same orientation as the rear window part. Its use in connection with three-part hardtop vehicle roofs is possible only with substantial additional expenses for the roof operating mechanism.

A vehicle roof comprising the rigid roof shells which, in the closed position of the roof, are arranged in the longitudinal vehicle direction one behind the other is known from EP 0 835 779 A1. The roof shells are connected to one another or, respectively, the vehicle body, and can be moved, by actuation of an operating mechanism, between the closed position and a storage position, in which the roof shells are deposited in a rear storage compartment behind the vehicle interior. In order to achieve a compact storage volume in the storage position, the front roof shell is disposed between the rear and the intermediate roof shells. The rear roof shell, which carries also the rear window panel, is deposited with the curved outer side facing downwardly so that the required storage space in vertical direction is relatively large at the expense of the trunk space of the vehicle.

It is the object of the present invention to provide a multi-part hardtop vehicle roof, which, in its storage position, requires relatively little storage space.

SUMMARY OF THE INVENTION

In a hardtop vehicle roof, which is movable between a closed position in which it covers a vehicle interior, and a storage position and which includes rigid roof shells which, in the closed position, are disposed end to end adjacent one another, at least one of the roof shells includes a center section and side sections which are pivotally connected to the center section and the center sections are displaced in the storage position of the roof shells upwardly relative to the respective side sections so as to be received within one of the roof shells thereby to reduce the volume required for the storage of the roof shells in the storage position thereof.

With this arrangement, in the storage position of the vehicle roof, the intermediate roof section can be pivoted relative to the side sections of the roof, whereby the intermediate roof section is displaced about parallel to its original position. The plane of the intermediate roof section is displaced relative to the plane of the side roof sections, which results in an increase of the available trunk space. Particularly in a storage arrangement, in which the roof parts are disposed in the storage compartment essentially horizontally on top of one another, the intermediate roof section may be displaced upwardly with respect to the side roof sections so that a larger usable trunk space remains available below the stored roof sections.

Expediently, the hardtop vehicle roof comprises three roof sections a front, an intermediate and a rear roof shell. Preferably, the front and the rear roof shells each include two side sections and a center section to which side sections are pivotally connected. The center section of the rear roof shell also includes the rear window panel which, in the storage position, is pivoted with respect to the side sections of the roof, which essentially comprise the C-pillars and which is preferably displaced upwardly. The same is true for the front roof shell whose center section is also displaced upwardly when in the storage position. Expediently, the roof package is so arranged in the storage compartment that the front and the rear roof shells are deposited in the same orientation and the respective center sections are displaced upwardly in the storage position. In a storage configuration in which the front roof shell is disposed between the rear roof shell, which is disposed at the bottom, and the intermediate roof shell, which is disposed on top, a particularly compact storage volume can be achieved since the immediately adjacent center sections of the front and the rear roof shells are both displaced upwardly and are received in the curved part of the intermediate roof shell whose outer surface faces expediently upwardly.

It is advantageous if the center roof section of a roof shell is freely movable with respect to an adjacent roof shell in order to facilitate, in the storage position, the desired relative movement with respect to the side sections of the roof shells, which are pivotally connected to the respective center sections.

Further advantages and suitable embodiments of the invention will become apparent from the following description of the invention on the basis of the accompanying drawings:

DESCRIPTION OF A PREFERRED EMBODIMENT

Figure 1:
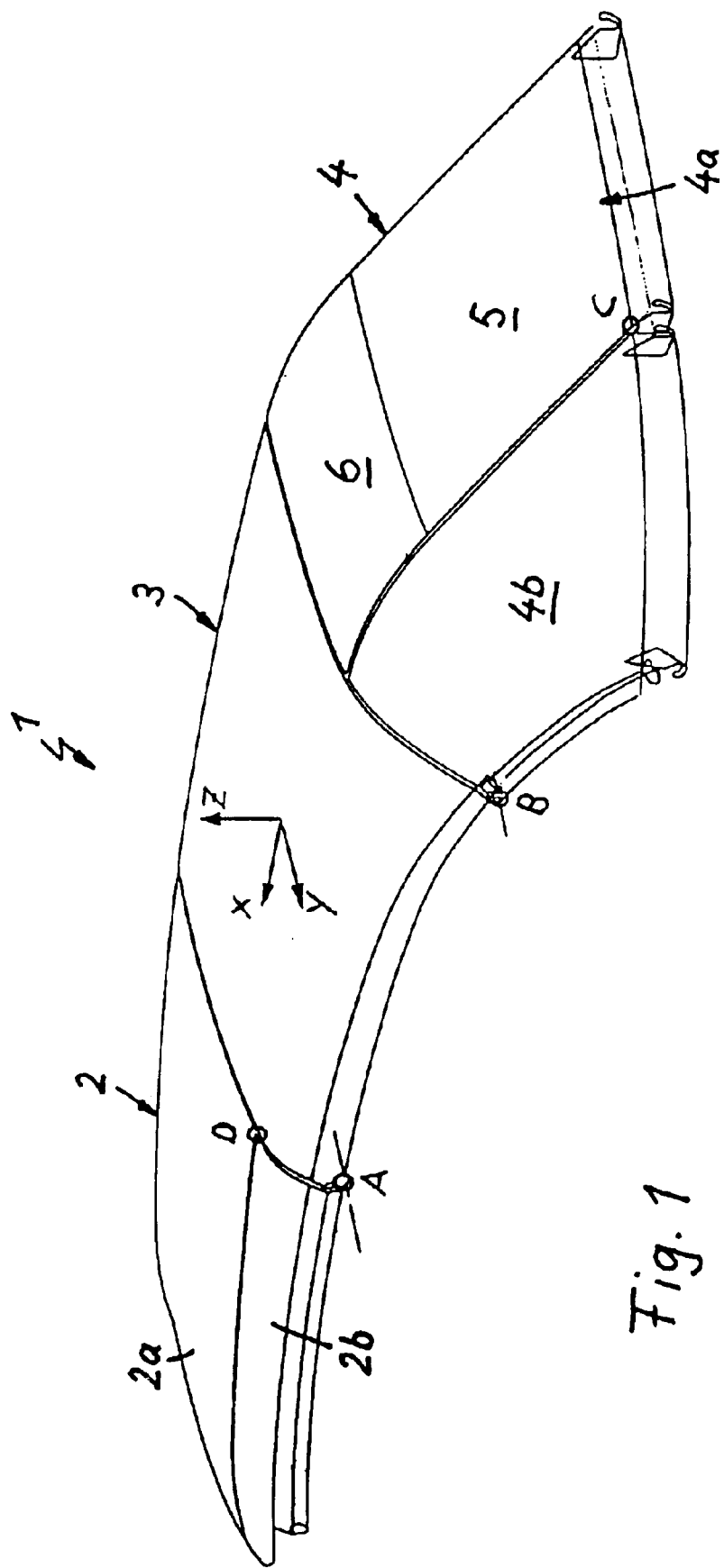
FIG. 1 is a perspective view of a three-part hardtop vehicle roof with a front, an intermediate and a rear roof shell in a closed position wherein the front and rear roof shells each comprise three sections.

The vehicle roof 1 as shown in FIG. 1 is a three-part hardtop roof including a front roof shell 2, an intermediate roof shell 3 and a rear roof shell 4, which are all rigid and which can be moved between a closed position as shown in FIG. 1 wherein the roof covers an interior vehicle space, and a storage position, in which the vehicle roof is deposited in a rear storage compartment. In the closed position, the three roof shells 2, 3 and 4 are arranged in the x-direction one behind the other. The front roof shell is kinematically coupled to the intermediate roof shell 3, which again is kinematically connected to the vehicle body by way of a roof operating mechanism. The roof operating mechanism is actuated by a control element for moving the vehicle roof 1 between the closed and the storage positions.

The front shell 2 as well as the rear roof shell 4 consist each of three sections. The front roof shell 2 comprises a center section 2a and side sections 2b, of which only one side section is shown in the perspective view of FIG. 1. The separation lines between the center sections 2a and the side sections 2b extend parallel to the longitudinal vehicle axis x. The center section 2a is coupled to the side section 2b by a joint D and the side section 2b is pivotally connected to the intermediate roof shell 3 by way of a joint A. The center section 2a of the front roof shell 2 is otherwise freely movable relative to the intermediate roof shell 3. The joint A between the side roof section of the front roof shell 2 and the intermediate roof shell 3 permits a relative movement about a transverse axis which extends parallel to the transverse vehicle axis y. Expediently, the joint A permits additionally a pivot movement about an axis in the longitudinal direction of the vehicle. The joint D between the center section 2a and the side section 2b of the front roof shell 2 permits a relative pivot movement between these two roof sections about a longitudinal axis which extends parallel to the longitudinal vehicle axis x.

Also, the rear roof shell 4 comprises a center section 4a and two side sections 4b at opposite sides of the center section 4a. The side sections 4b are expediently the C-columns of the vehicle roof. The center section 4a of the rear roof shell 4 comprises a rear window panel 5 and a frame member 6. The rear window panel 5 and a frame member 6 are firmly interconnected. The center section 4a and the side sections 4b of the rear roof shell 4 are connected to one another by a joint C. The joint C between the center section 4a and the side section 4b preferably has a pivot axis, which extends essentially in the longitudinal vehicle direction x. Furthermore the center section 4a expediently has no further kinematic restraints; particularly, it is not connected to the intermediate roof shell 3 nor to the vehicle body. The side section 4b of the rear roof shell 4 is pivotally connected to the intermediate roof shell 3 by way of a joint B such that the joint B permits a relative rotation about a transverse axis and expediently also a pivot movement about a longitudinal axis.

The side sections 4b of the rear roof shell 4 are connected to the vehicle body by a roof operating mechanism, which is not shown.

Figure 2:
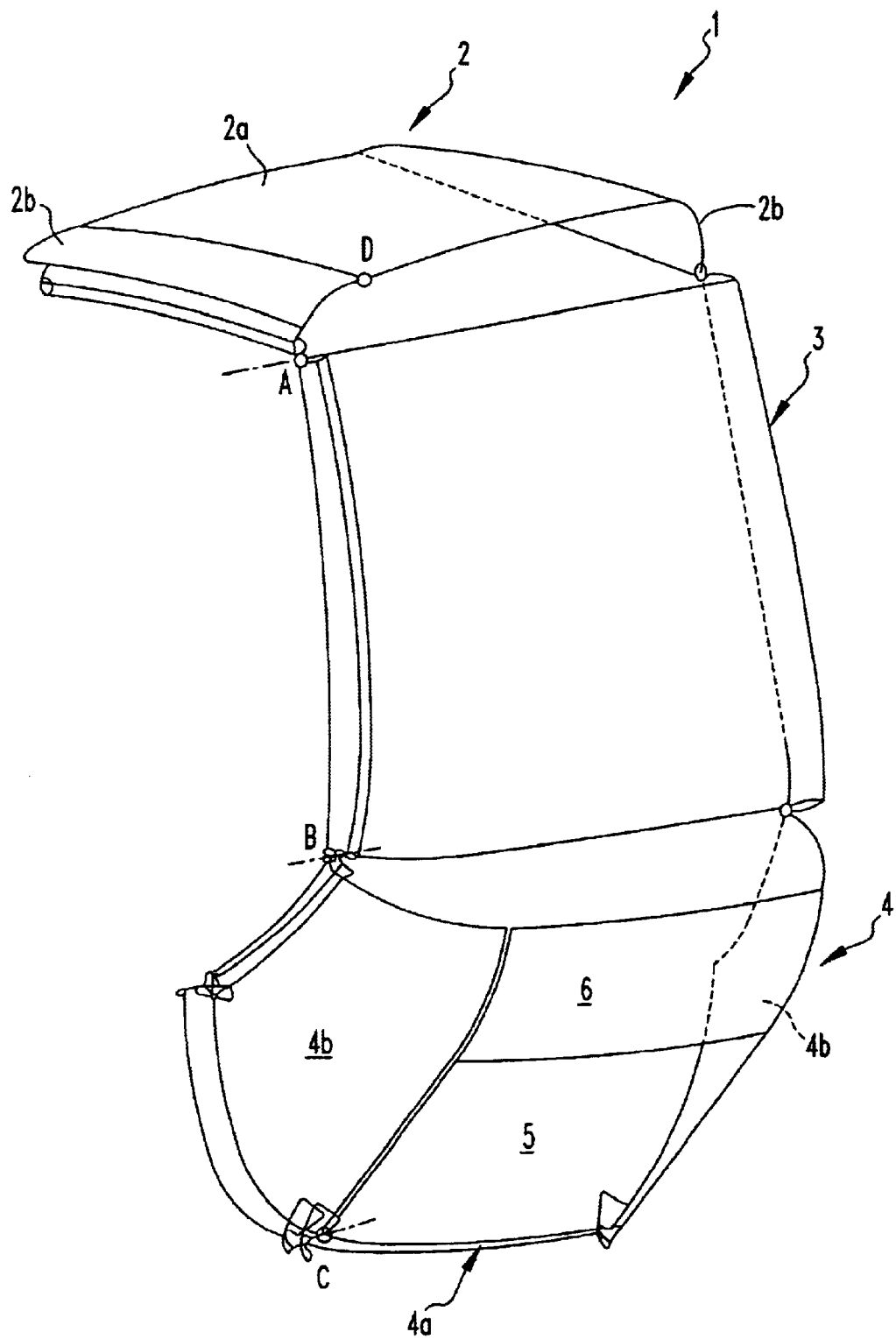
FIG. 2 shows the roof at the beginning of the transfer movement from the closed position to the storage position.

As shown in FIG. 2, at the beginning of the transfer movement of the vehicle roof 1 from the closed position to the storage position, the rear roof shell 4, which is connected to the vehicle body, is pivoted rearwardly: at the same time, the front roof shell 2 is pivoted about the axis of the joint A relative to the intermediate roof shell 3, which again is pivoted about the pivot axis of the joint B relative to the rear roof shell 4. During the initial movement phase in the transfer from the closed to the storage position, the center sections 2a and 4a and the side sections 2b and 4b maintain in their original relative positions, that is, no pivoting about the pivot axes of the joints D or, respectively, C occurs.

Figure 3:
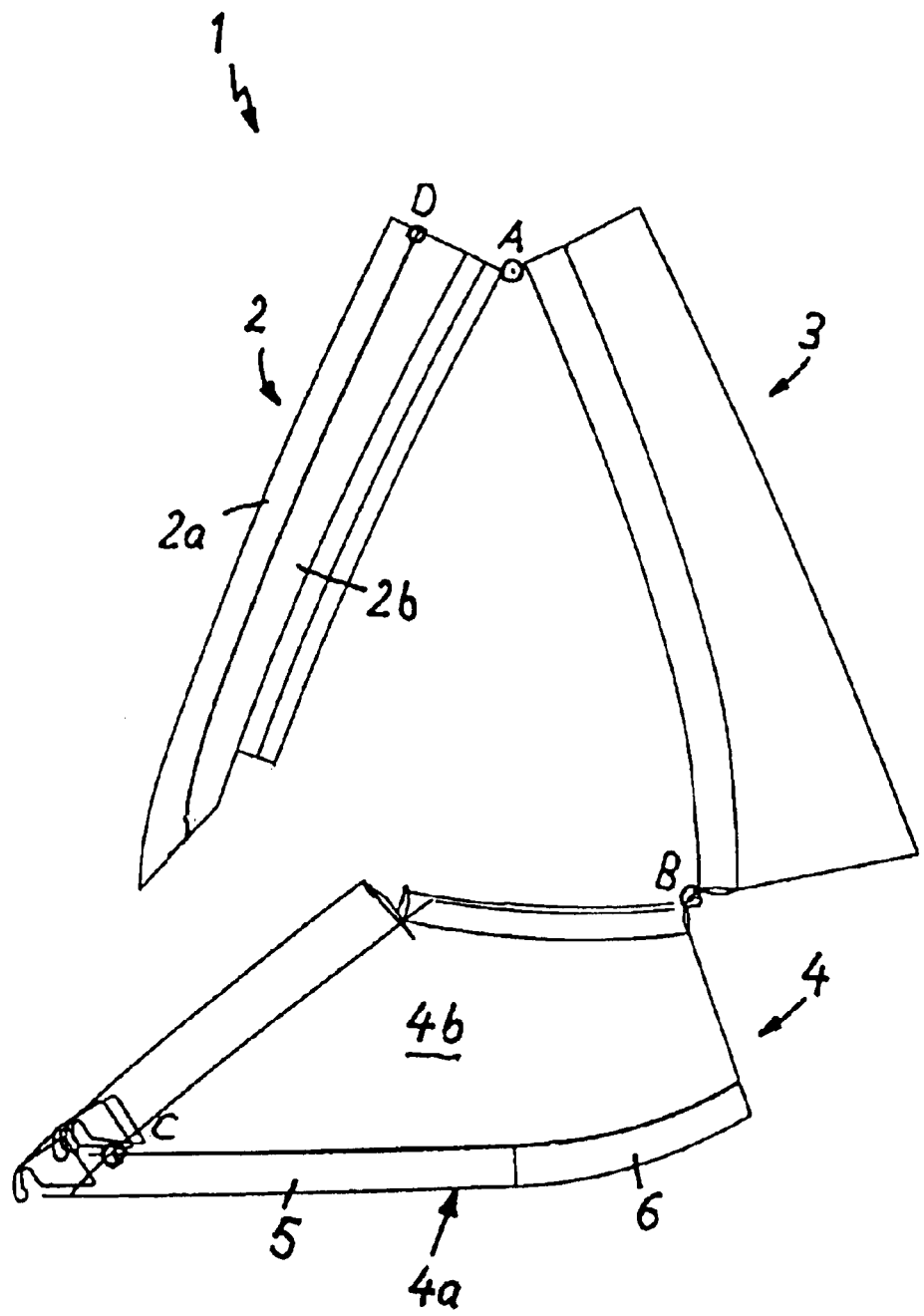
FIG. 3 is side view of the vehicle roof in a further advanced opening position during the transfer to the storage position.
Figure 4:
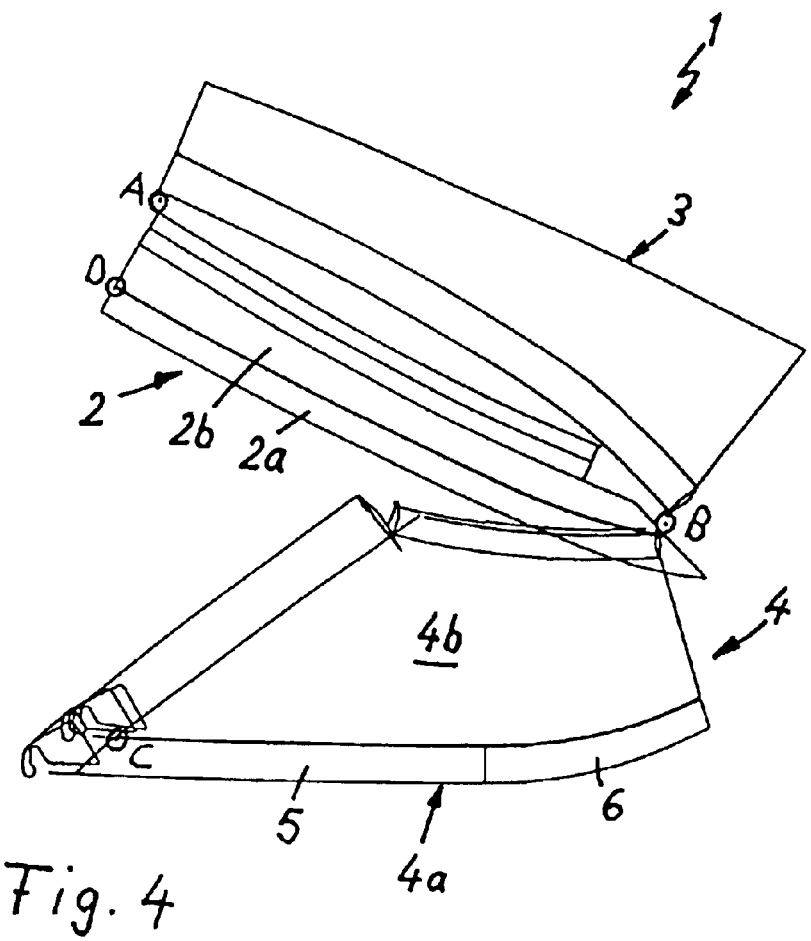
FIG. 4 is another side view of the vehicle roof showing the parts in a position shortly before reaching the storage position.

From FIGS. 3 and 4, it is apparent that, for the transfer to the storage position, the front roof shell 2 is pivoted between the rear roof shell 4 and the intermediate roof shell 3. The rear roof shell 4 is pivoted backwardly to such an extent that it extends essentially horizontally and is deposited with the outer side of the roof shell 4 facing downwardly. The intermediate roof shell 3, which in the storage position is disposed on top of the complete roof shell package, is disposed on top with its top side facing upwardly. During the whole transfer movement from the closed to the storage position the center and the side sections of the front roof shell 2 and the rear roof shell 4 remain in their original positions relative to each other.

Figure 5:
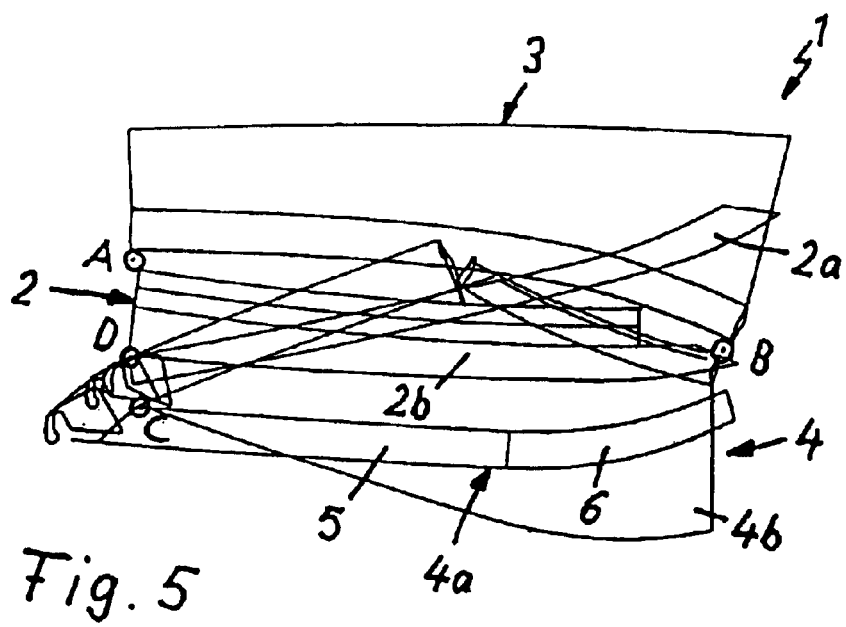
FIG. 5 shows the vehicle roof in the storage position.
Figure 6:
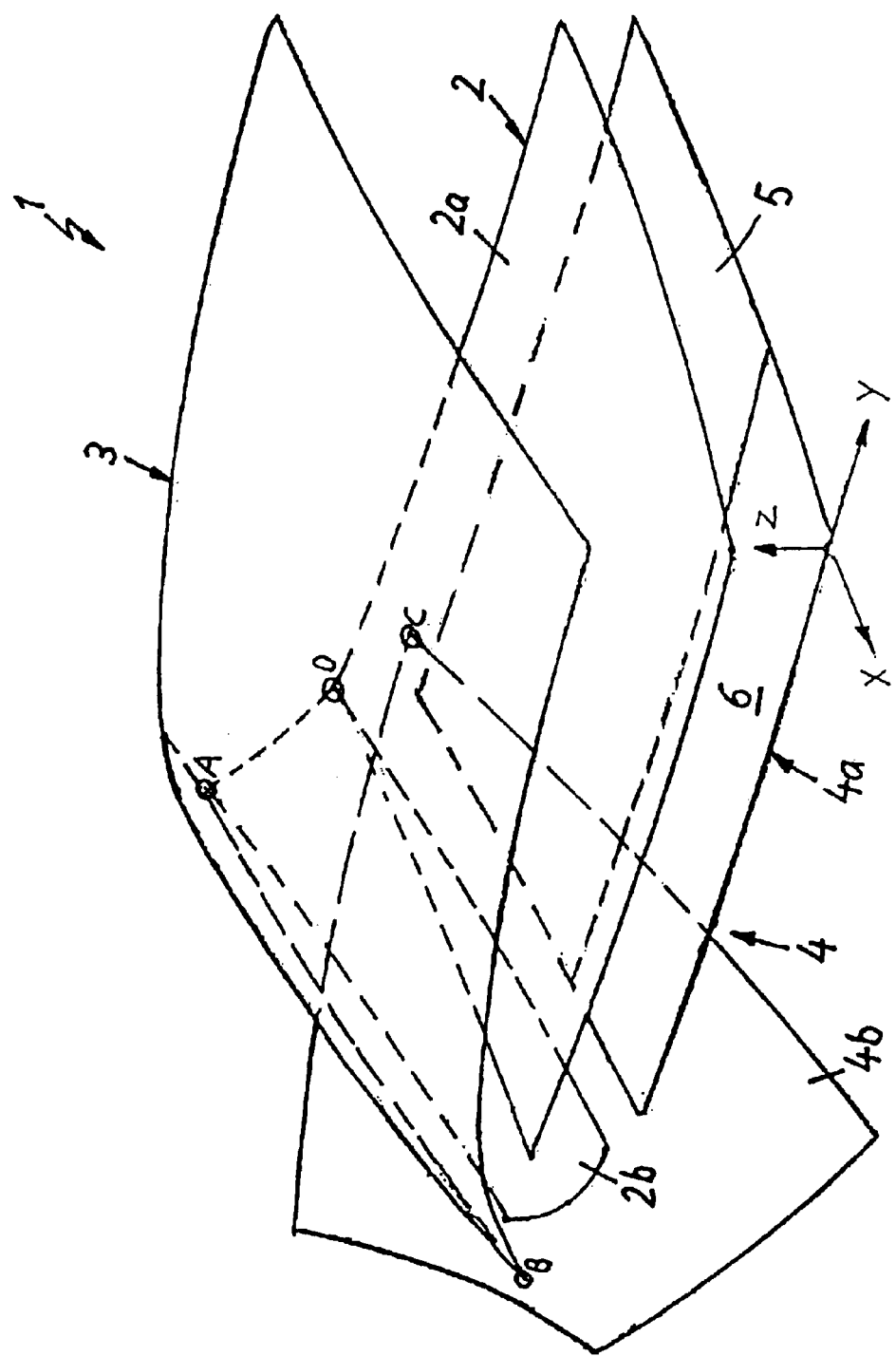
FIG. 6 is a perspective schematic view of the vehicle roof in the storage position.

FIGS. 5 and 6 show the vehicle roof 1 in the storage position. When the roof shells have reached their storage positions the relative movement of the center roof sections 2a and 4a relative to their side sections 2b and respectively, 4b is initiated whereby the center sections 2a and 4a are displaced upwardly with respect to their side sections 2b and 4b. Because of the kinematic connection such upward displacement of the center sections 2a and 4a (which are disposed with their top sides facing downwardly) the side sections 2b and 4b are pivoted about their outer joints A and respectively B. Since in the joints D and C at both sides of the center section adjacent the side sections a pivot movement is synchronously executed the outer sections 2a and 4a respectively, are moved upwardly. The center roof section 4a of the rear roof shell 4, which is disposed in the storage package of roof shells at the bottom and the center section 2a of the front roof shell 2, which is disposed in the roof shell package, move therefore upwardly in unison and are accommodated in the curved intermediate roof shell 3, which is disposed on top.

What is claimed is:

1. A hardtop vehicle roof movable between a closed position in which it covers an interior space of a vehicle and a storage position, in which the roof (1) is disposed in a rear storage compartment, said hardtop vehicle roof (1) including front, intermediate and rear rigid roof shells (2, 3, 4) which, in the closed position, are disposed, in the longitudinal vehicle direction, one behind the other and wherein said front and rear roof shells (2, 4) comprise each three sections, a center roof section (2a, 4a) and opposite side roof sections (2b, 4b), which are pivotally connected to the respective center roof sections (2a, 4a), said center roof sections (2a, 4a), being displaced in the storage position of said roof (1) upwardly relative to the respective roof shell side sections (2b, 4b), said side roof sections (2b, 4b) of the front and rear roof shells (2,4) and the center roof sections (2a, 4a) of the front and rear roof shells (2, 4) which have outer surfaces which face downwardly in said storage positions and are displaced upwardly being received in the intermediate roof shell (3), which is upwardly curved in the storage position.

2. A hardtop vehicle roof according to claim 1, wherein said roof (1) includes three roof shells (2, 3, 4).

3. A hardtop vehicle roof according to claim 2, wherein each of said front roof shell (2) and said rear roof shell (4) comprises three sections.

4. A hardtop vehicle roof according to claim 2, wherein in the storage position the front roof shell (2) is disposed between the rear roof shell (4) and the intermediate roof shell (3), which is disposed on top.

5. A hardtop vehicle roof according to claim 2, wherein said front roof shell (2) and said rear roof shell (4) are deposited in the storage position in the same orientation.

6. A hardtop vehicle roof according to claim 5, wherein said front roof shell and said rear roof shell have outer roof surfaces which, in the storage position of the front roof shell (2) and of the rear roof shell (4), face downwardly.

7. A hardtop vehicle roof according to claim 1, wherein said rear roof shell (4) comprises three sections, a center section (4*a*) and side sections (4*b*), said center section including a rear window panel.

8. A hardtop vehicle roof according to claim 1, wherein the side roof sections (2*b*, 4*b*) are pivotally connected to the intermediate roof shell (3) and the center sections (2*a*, 4*a*) of the roof shells (2, 4) are movable relative to the intermediate roof shell (3).

9. A hardtop vehicle roof according to claim 8, wherein the side roof sections (2*b*, 4*b*) are connected to adjacent ends of the center roof shell (3) by pivot joints (A, B).

* * * * *